US012659769B2

(12) United States Patent  
Lake

(10) Patent No.: US 12,659,769 B2  
(45) Date of Patent: Jun. 16, 2026

(54) METHODS AND APPARATUS FOR DEPLOYMENT OF MONITORING AND CONTROL DEVICES IN A WIRELESS NETWORK

(71) Applicant: Ecolab USA Inc., Saint Paul, MN (US)

(72) Inventor: Larry Arvid Lake, Woodbury, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 18/647,640

(22) Filed: Apr. 26, 2024

(65) Prior Publication Data

US 2024/0365142 A1 Oct. 31, 2024

Related U.S. Application Data

(60) Provisional application No. 63/499,184, filed on Apr. 28, 2023.

(51) Int. Cl.  
    *H04B 3/46* (2015.01)  
    *H04B 17/23* (2015.01)  
    (Continued)

(52) U.S. Cl.  
    CPC ............ *H04W 24/06* (2013.01); *H04B 17/23* (2015.01); *H04B 17/318* (2015.01)

(58) Field of Classification Search  
    CPC ....... H04W 24/06; H04W 4/80; H04W 84/18; H04B 17/23; H04B 17/318; G08C 17/02  
    (Continued)

(56) References Cited

U.S. PATENT DOCUMENTS 7,348,890 B2 * 3/2008 Barber .................. A01M 1/026  
                                                 43/132.1  
2015/0061829 A1 * 3/2015 Williams ................. G07C 9/28  
                                                 340/5.61

(Continued)

FOREIGN PATENT DOCUMENTS

CN      210724820      6/2020  
WO    2024226985    10/2024

OTHER PUBLICATIONS

"International Application Serial No. PCT US2024 026530, International Search Report mailed Aug. 1, 2024", 4 pgs.

(Continued)

*Primary Examiner* — Helene E Tayong  
(74) *Attorney, Agent, or Firm* — Schwegman Lundberg & Woessner, P.A.

(57) ABSTRACT

Various examples are directed to apparatus and methods for deploying wireless control devices in a wireless network. A method includes providing a portable wireless signal strength measurement device configured with one or more wireless interfaces to emulate communication capabilities of a control device. The portable wireless signal strength measurement device is transported to a potential location for placement of the control device, and a control on the measurement device is actuated to trigger communication with a gateway for managing the control device. A response signal is sensed using the portable wireless signal strength measurement device, and a signal strength of the response signal is determined using the measurement device. When the determined signal strength of the response signal is greater than or equal to a programmable threshold, the potential location is selected for placement of the control device.

23 Claims, 4 Drawing Sheets

(51) Int. Cl.
    *H04B 17/318*       (2015.01)
    *H04W 24/06*       (2009.01)

(58) Field of Classification Search
    USPC .......................................................... 375/228
    See application file for complete search history.

(56)               References Cited

U.S. PATENT DOCUMENTS

| | | | |
|---|---|---|---|
| 2017/0140333 A1* | 5/2017 | Rinzler | .................. H02J 50/10 |
| 2018/0202813 A1* | 7/2018 | Belt | .................. G01C 21/3652 |
| 2021/0021972 A1* | 1/2021 | Belt | ...................... H04W 4/029 |

OTHER PUBLICATIONS

"International Application Serial No. PCT US2024 026530, Written Opinion mailed Aug. 1, 2024", 6 pgs.

\* cited by examiner

100

BATTERY COMPARTMENT

102

106

ASSORTED CIRCUIT BOARDS

104

BATTERY COMPARTMENT

150

152

156

158

160

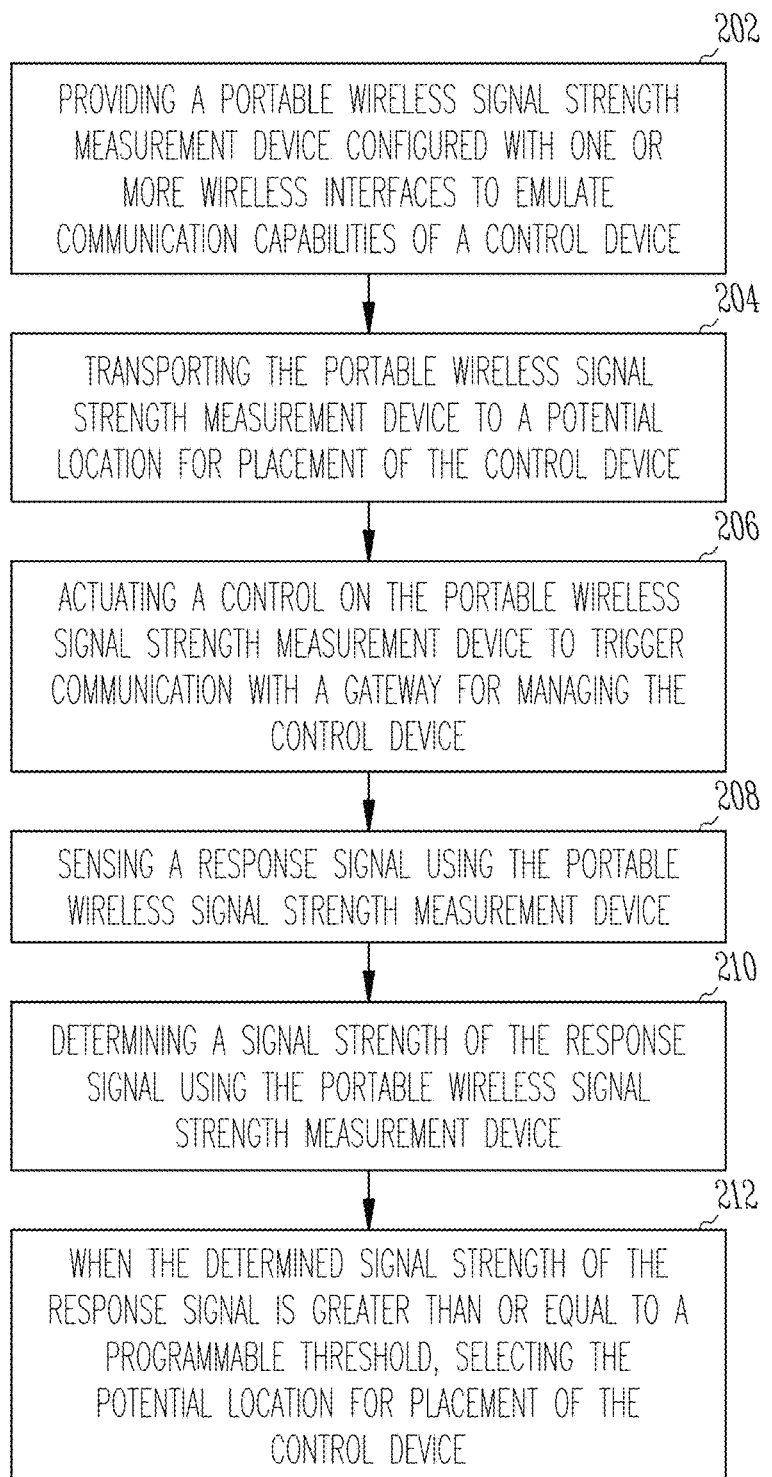

200 —

202

PROVIDING A PORTABLE WIRELESS SIGNAL STRENGTH MEASUREMENT DEVICE CONFIGURED WITH ONE OR MORE WIRELESS INTERFACES TO EMULATE COMMUNICATION CAPABILITIES OF A CONTROL DEVICE

204

TRANSPORTING THE PORTABLE WIRELESS SIGNAL STRENGTH MEASUREMENT DEVICE TO A POTENTIAL LOCATION FOR PLACEMENT OF THE CONTROL DEVICE

206

ACTUATING A CONTROL ON THE PORTABLE WIRELESS SIGNAL STRENGTH MEASUREMENT DEVICE TO TRIGGER COMMUNICATION WITH A GATEWAY FOR MANAGING THE CONTROL DEVICE

208

SENSING A RESPONSE SIGNAL USING THE PORTABLE WIRELESS SIGNAL STRENGTH MEASUREMENT DEVICE

210

DETERMINING A SIGNAL STRENGTH OF THE RESPONSE SIGNAL USING THE PORTABLE WIRELESS SIGNAL STRENGTH MEASUREMENT DEVICE

212

WHEN THE DETERMINED SIGNAL STRENGTH OF THE RESPONSE SIGNAL IS GREATER THAN OR EQUAL TO A PROGRAMMABLE THRESHOLD, SELECTING THE POTENTIAL LOCATION FOR PLACEMENT OF THE CONTROL DEVICE

Fig.2

METHODS AND APPARATUS FOR DEPLOYMENT OF MONITORING AND CONTROL DEVICES IN A WIRELESS NETWORK

CLAIM OF PRIORITY AND INCORPORATION BY REFERENCE

The present application claims the benefit under 35 U.S.C. § 119 (e) of U.S. Provisional Patent Application 63/499,184, filed Apr. 28, 2023, the disclosure of which is hereby incorporated by reference herein in its entirety.

TECHNICAL FIELD

This disclosure relates generally to methods and apparatus for deployment of wireless monitoring and control devices in a wireless network.

BACKGROUND

Internet of things (IoT) or other control systems have evolved into complex systems which can be configured using a number of wireless monitoring and control devices. Different wireless communication standards can be used to communicate with network devices, which may include another computer.

One of the issues involved in setting up a wireless system is that internal structures often have different room sizes and materials which may serve as an obstacle to wireless communications. It can be challenging to deploy wireless devices that can reliably communicate with other network devices. Communication issues can be structure specific, such as a laboratory or warehouse where the ability to communicate may by location within the structure. Communication issues are also found in systems which are configured to be outside of a structure.

There is a need in the art for methods and apparatus for deploying wireless devices of a control system such that reliable wireless communications are established and maintained.

SUMMARY

A system for deploying wireless control devices on a premises with a wireless communication point. The present apparatus and methods provide a portable wireless interrogator that emulates a wireless control device to ensure that the wireless control device can communicate with the wireless communication point. In various embodiments, the portable wireless interrogator includes multiple wireless interfaces that can be selectively tested by the interrogator to determine if the deployment is functional and provides adequate signal quality which may be measured by signal strength and by other metrics including, but not limited to, bit error rate.

Various examples are directed to apparatus and methods for deploying wireless control devices in a wireless network. A method includes providing a portable wireless signal strength measurement device configured with one or more wireless interfaces to emulate communication capabilities of a control device. The portable wireless signal strength measurement device is transported to a potential location for placement of the control device, and a control on the portable wireless signal strength measurement device is actuated to trigger communication with a gateway for managing the control device. A response signal is sensed using the portable wireless signal strength measurement device, and a signal strength of the response signal is determined using the portable wireless signal strength measurement device. The response signal may be received directly from the gateway or indirectly via cellular, cloud, back-end process or other type of signal. When the determined signal strength of the response signal is greater than or equal to a programmable threshold, the potential location is selected for placement of the control device. The present system may be used with pest control devices, IoT devices, or the like.

Various examples are directed to a portable wireless interrogator device for deploying wireless control devices in a wireless network. The interrogator device includes one or more wireless interfaces comprising a wireless communications module and antennae, and one or more controls on the device configured to be actuated to trigger communication with a gateway for managing a control device. The interrogator device further includes one or more sensors configured to sense a response signal, and a processor configured to determine a signal strength of the response signal. The interrogator device also includes one or more display elements on the device configured to illuminate to provide an indication of the determined signal strength.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

The drawings illustrate generally, by way of example, various embodiments discussed in the present document. The drawings are for illustrative purposes only and may not be to scale.

FIG. 2 illustrates an example embodiment of a method for deploying wireless devices of a control system, according to various embodiments.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The scope of the present invention is defined by the appended claims, along with the full scope of legal equivalents to which such claims are entitled.

The present subject matter relates to methods and devices setting up wireless networks for control devices. A portable wireless interrogator (also referred to herein as a portable wireless signal strength measurement device) is provided by the present subject matter that emulates wireless communication capabilities of a control device. The portable wireless interrogator may include one or more antennae and one or more wireless communication modules or circuits to enable the portable wireless interrogator to communicate using one or more wireless standards. The wireless standards used by the interrogator include, but are not limited to one or more of the following: LoRa, near-field communication (NFC), Bluetooth, Bluetooth Low Energy (BLE), Ethernet, Wi-Fi, WiMax, Zigby, or cellular standard communications such as 3G, 4G, LTE, 5G. Other wireless standards may be used without departing from the scope of the present subject matter.

Figure 1A:
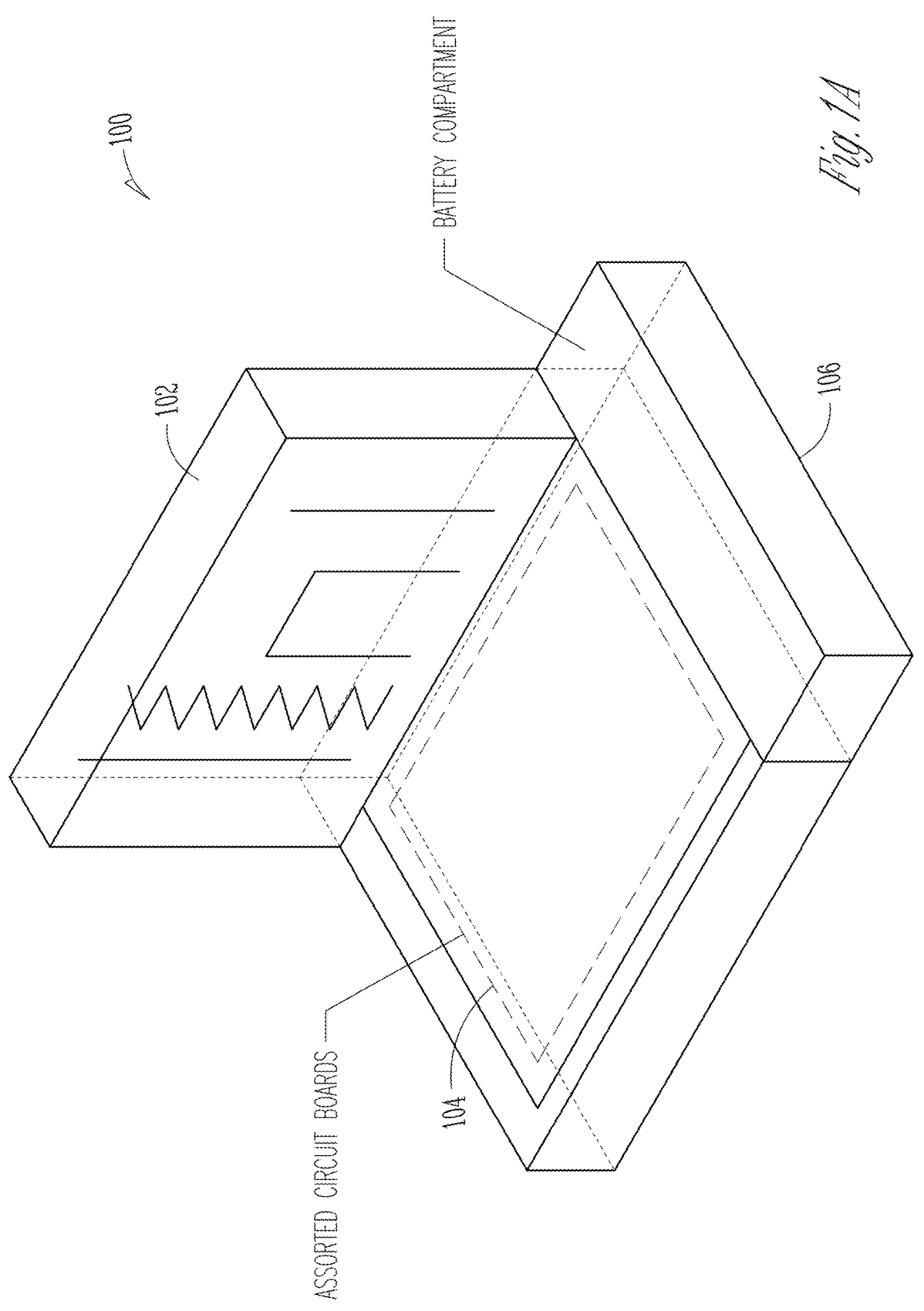
FIG. 1A is an illustration of an embodiment of a portable wireless interrogator showing internal components of the interrogator.

FIG. 1A is an illustration of an embodiment of a portable wireless interrogator showing internal components of the interrogator. The portable wireless interrogator device 100 may be used for deploying wireless pest control devices, IoT devices, or other devices in a wireless network. The interrogator device 100 includes one or more wireless interfaces comprising a wireless communications modules, or assorted circuit boards 104 and antennae 102, and one or more controls on the device configured to be actuated to trigger communication with a gateway for managing a control device. The antennae 102 may include assorted antennae representative of a variety of wireless pest control devices, enabling replication of communications of the wireless pest control devices, in various embodiments. The interrogator device 100 further includes one or more sensors configured to sense a response signal, and a processor configured to determine a signal strength of the response signal. The interrogator device 100 also includes one or more display battery compartments 106 on the device configured to hold one or more batteries to power the device 100, in various embodiments.

According to various embodiments, the wireless communications module may include a circuit and antenna to support wireless communications such as LoRa, LoRaWAN, Bluetooth, Bluetooth Low Energy (BLE), near-field communications (NFC), Ethernet, a Wi-Fi, a WiMax, cellular, or Zigby communications protocols. Other wireless communications protocols may be used by the device 100 without departing from the scope of the present subject matter.

Figure 1B:
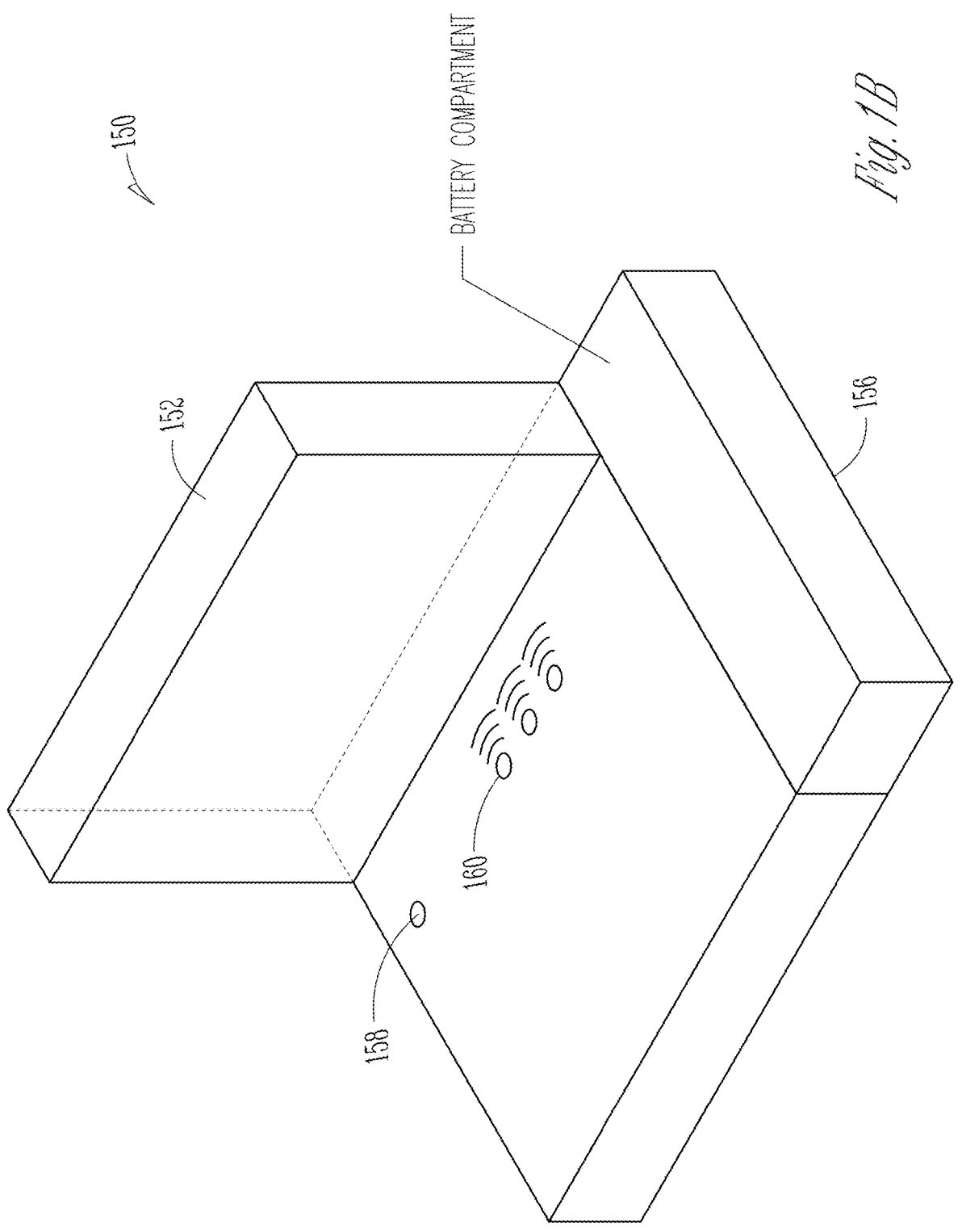
FIG. 1B is an illustration of an embodiment of a portable wireless interrogator showing external components of the interrogator.

FIG. 1B is an illustration of an embodiment of a portable wireless interrogator showing external components of the interrogator. The interrogator device 150 includes one or more wireless interfaces including a wireless communications module, and may include a housing 152 for one or more antennae for wireless communication, and a battery compartment 156. The interrogator device also includes one or more display elements on the device configured to illuminate to provide an indication of the determined signal strength. In one example, the one or more display elements include a first indicator 158, such as a light emitting diode (LED) or the like, that illuminates to indicate successful communication by the device 150. In various examples, the one or more display elements include a second group of indicators 160, such as LEDs or the like, that illuminates to provide an indication of signal strength from the gateway or router. For example, a single indicator of the second group of indicators 160 may be illuminated to indicate a weak signal, and three or more indicators of the second group of indicators 160 may be illuminated to indicate a strong signal from the gateway or router (or an indirect signal or from another device, the cloud, or back-end process). Other numbers of indicators may be used without departing from the scope of the present subject matter.

Installation of wireless communications systems is especially challenging for the pest control industry due to the complexity and scale of the installations occurring over hundreds of thousands of square feet with hundreds of pest control devices, in some examples. The present device and method may be used in any location for pest control device deployment that leverage wireless communications equipment and is increasingly beneficial as the total amount of wireless pest control devices increases per site, in various embodiments. The present device and method may be used for installation of any IoT device or other wireless control device, in various examples.

In various embodiments, the present subject matter provides a device or tool which is used during installation and ongoing troubleshooting to determine signal and system strength of wireless communications from a wireless control device to a gateway or router or the like. The tool enables repeated signal testing to a gateway or router throughout a customer location to understand near real time (less than 10 seconds) whether preplaced gateways are within range for wireless communication and what the signal strength is for the communication. The system allows repeated signal strength testing with no limit to how often the signal can be detected and is built to be an exact proxy of a wireless pest control device for wireless communication signal strength.

The present interrogator device enables a method to quickly and easily determine whether a control device installed in a specific area of interest will have sufficient wireless signal reception, in various embodiments. The device may also be used to troubleshoot connectivity issues of an already installed control device, in various examples. In one example, if a control device loses wireless connection or does not have a wireless connection, a user can use the present interrogator device to determine where the control device would have sufficient signal strength within the facility and understand roughly how much the existing gateway would need to be moved to provide access, allowing a user to determine if the control device should be moved, or if the gateway should be moved, or if another gateway should be installed.

According to various embodiment, the present interrogator device uses the same antenna and communication hardware as the selected control device to ensure an exact proxy for communication strength that enables a method to repeatedly test whether the control device will be able to be installed in the location of interest with sufficient communication capabilities. The user may then walk around a facility with the interrogator device after the gateway has been installed to evaluate if a control device will be within communication range of the gateway when installed. This operation is important as testing signal strength for each unique control device when placed is very time consuming and requires retesting if a gateway has to be relocated to optimize signal coverage at a designated location. In various embodiments, the present interrogator device may include numerous standard antennas installed on the interrogator device to allow the user to test whether a multitude of unique control devices would be within range of a preinstalled gateway or router.

The present subject matter may be used with wireless pest control devices, including but not limited to baits, traps and pest monitors. The wireless pest control devices have limited range, and should communicate with a router or gateway for successful operation. The present device may be used inside a structure such as a warehouse, office, kitchen, hotel, retail store, or home, or may be used outside in a yard or a field, or other location, in various embodiments. The present device is portable, so that it may be carried by a user to various locations to determine strength of signal between a router or gateway and the interrogator device at the various locations, to enable proper selection of a location of the various locations for placement of the pest control device. The present interrogator device includes a quick attach/detach system for housing various communications electronics so that the interrogator device may emulate the communication capabilities of a desired pest control device, in some embodiments. In addition, the battery capabilities of the interrogator device allow for repeated use with multiple wireless standards without concern for battery depletion, in one example. Some communication protocols include a timeout feature that limits a number of communication attempts to preserve battery power. In some embodiments, the interrogator device may deactivate or inhibit this timeout feature to allow for repeated attempts at communication without triggering a timeout that would further deplete the battery of the interrogator device. Because of the limited transmission range of the pest control devices, the present interrogator device ensures that the pest control device will be able to successfully communicate with the gateway or router prior to placing the pest control device in a selected location.

FIG. 2 illustrates an example embodiment of a method for deploying wireless devices of a control system, according to various embodiments. The method 200 includes providing a portable wireless signal strength measurement device configured with one or more wireless interfaces to emulate communication capabilities of a control device, at step 202. At step 204, the portable wireless signal strength measurement device is transported to a potential location for placement of the control device, and a control on the portable wireless signal strength measurement device is actuated to trigger communication with a gateway for managing the control device, at step 206. At step 208, a response signal is sensed using the portable wireless signal strength measurement device, and a signal strength of the response signal is determined using the portable wireless signal strength measurement device, at step 210. The response signal may be received directly from the gateway or indirectly via cellular, cloud, back-end process or other type of signal. When the determined signal strength of the response signal is greater than or equal to a programmable threshold, the potential location is selected for placement of the control device, at step 212. The present system may be used with pest control devices, IoT devices, or the like.

According to various embodiments, the method 200 further includes displaying an indication of the determined signal strength using the portable wireless signal strength measurement device. In one embodiment, displaying the indication of the determined signal strength includes illuminating one or more light-emitting diodes (LEDs) on a surface of the portable wireless signal strength measurement device. Other types of display elements may be used without departing from the scope of the present subject matter. Actuating a control on the portable wireless signal strength measurement device includes pressing a button on the portable wireless signal strength measurement device, in one example. Other types of controls may be used without departing from the scope of the present subject matter. In various embodiments, determining a signal strength of the response signal from the gateway using the portable wireless signal strength measurement device includes determining the signal strength in less than ten seconds. The method 200 may include repeatedly actuating the control on the portable wireless signal strength measurement device to trigger communication with a gateway for managing the control device, such as a pest control device, in various examples. The pest control device includes a pest monitoring device, or a pest containment device such as a trap, in various embodiments. The one or more wireless interfaces includes a LoRa communication interface, a Bluetooth Low Energy (BLE) communication interface, or other wireless communication interface, including antenna and communication circuitry, in various embodiments.

Figure 3:
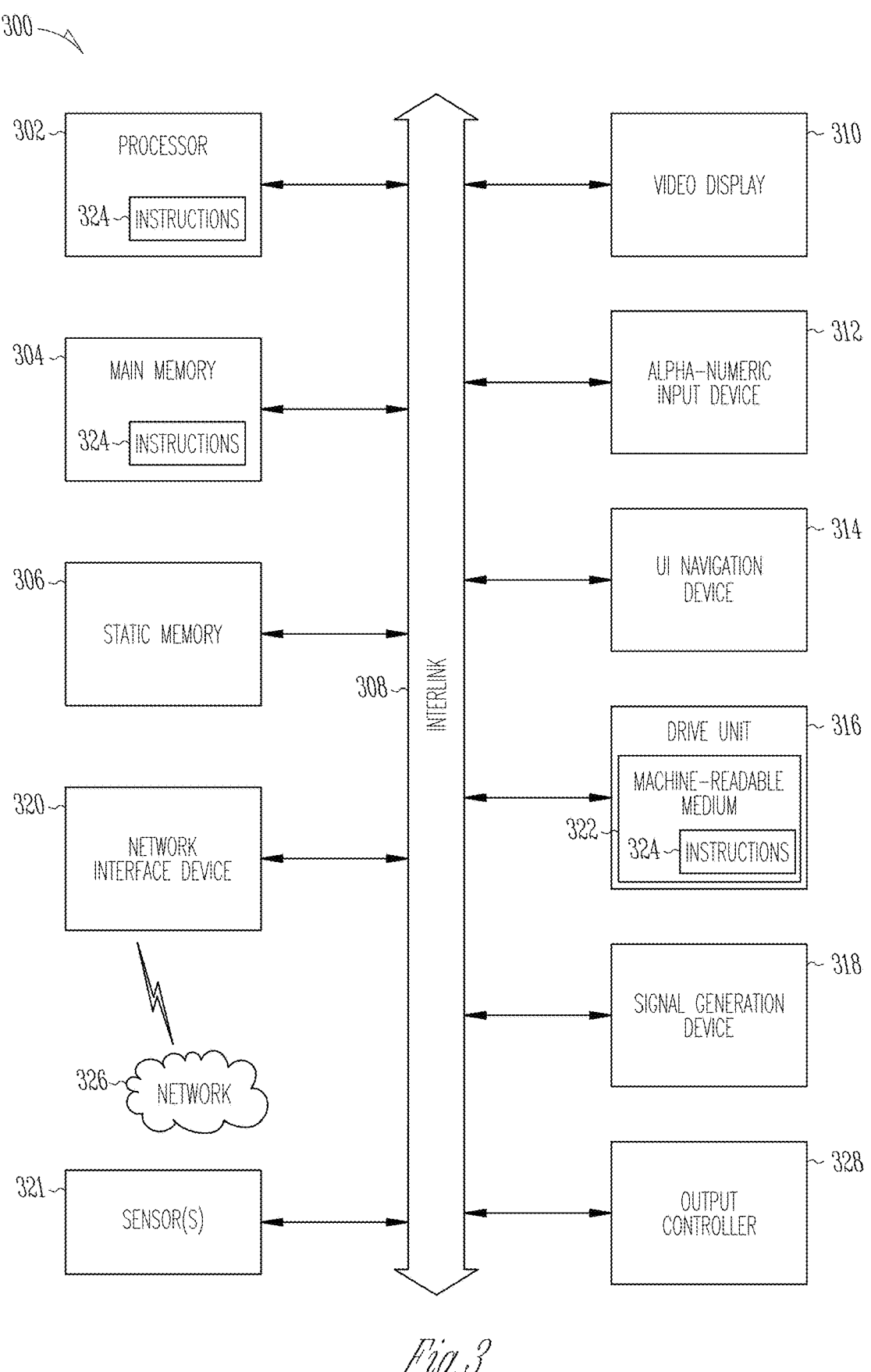
FIG. 3 is a block diagram of a machine in the example form of a computer system within which a set of instructions may be executed, for causing the machine to perform any one or more of the methodologies discussed herein.

FIG. 3 illustrates a block diagram of an example machine 300 upon which any one or more of the techniques (e.g., methodologies) discussed herein may perform. In alternative embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. The machine 300 may be configured to perform the method of FIG. 2. The machine 300 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The machine 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 324 may further be transmitted or received over a communications network 326 using a transmission medium via the network interface device 320. The Machine 300 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input multiple-output (SIMO), multiple-input multiple-output (MIMO), or multiple-input single-output (MISO) techniques. In some examples, the network interface device 320 may wirelessly communicate using Multiple User MIMO techniques.

OTHER NOTES AND EXAMPLES

Example 1 is a portable wireless interrogator device including one or more wireless interfaces comprising a wireless communications module and antennae, one or more controls on the device configured to be actuated to trigger communication with a gateway for managing a control device, one or more sensors configured to sense a response signal, a processor configured to determine a signal strength of the response signal, and one or more display elements on the device configured to illuminate to provide an indication of the determined signal strength.

In Example 2, the subject matter of Example 1 optionally includes wherein the wireless communications module includes a LoRa module.

In Example 3, the subject matter of Example 1 optionally includes wherein the wireless communications module includes a Bluetooth module.

In Example 4, the subject matter of Example 1 optionally includes wherein the wireless communications module includes a Bluetooth Low Energy (BLE) module.

In Example 5, the subject matter of Example 1 optionally includes wherein the wireless communications module includes a near-field communications (NFC) module.

In Example 6, the subject matter of Example 1 optionally includes wherein the wireless communications module includes an Ethernet module.

In Example 7, the subject matter of Example 1 optionally includes wherein the wireless communications module includes a Wi-Fi module.

In Example 8, the subject matter of Example 1 optionally includes wherein the wireless communications module includes a WiMax module.

In Example 9, the subject matter of Example 1 optionally includes wherein the wireless communications module includes a cellular communications module.

In Example 10, the subject matter of Example 1 optionally includes wherein the wireless communications module includes a Zigby module.

Example 11 is a method including providing a portable wireless signal strength measurement device configured with one or more wireless interfaces to emulate communication capabilities of a control device, transporting the portable wireless signal strength measurement device to a potential location for placement of the control device, actuating a control on the portable wireless signal strength measurement device to trigger communication with a gateway for managing the control device, sensing a response signal using the portable wireless signal strength measurement device, determining a signal strength of the response signal using the portable wireless signal strength measurement device, and when the determined signal strength of the response signal is greater than or equal to a programmable threshold, selecting the potential location for placement of the control device.

In Example 12, the subject matter of Example 11 optionally further includes displaying an indication of the determined signal strength using the portable wireless signal strength measurement device.

In Example 13, the subject matter of Example 12 optionally includes wherein displaying the indication of the determined signal strength includes illuminating one or more light-emitting diodes (LEDs) on a surface of the portable wireless signal strength measurement device.

In Example 14, the subject matter of Example 11 optionally includes wherein actuating a control on the portable wireless signal strength measurement device includes pressing a button on the portable wireless signal strength measurement device.

In Example 15, the subject matter of Example 11 optionally includes wherein determining a signal strength of the response signal from the gateway using the portable wireless signal strength measurement device includes determining the signal strength in less than ten seconds.

In Example 16, the subject matter of Example 11 optionally includes wherein the control device includes an internet of things (IoT) device.

In Example 17, the subject matter of Example 11 optionally includes wherein the control device includes a pest control device.

In Example 18, the subject matter of Example 17 optionally includes wherein the pest control device includes a pest monitoring device or a pest containment device.

In Example 19, the subject matter of Example 11 optionally includes wherein the one or more wireless interfaces includes a LoRa communication interface.

In Example 20, the subject matter of Example 11 optionally includes wherein the one or more wireless interfaces includes a Bluetooth Low Energy (BLE) communication interface.

In Example 21, the subject matter of Example 11 optionally includes wherein sensing a response signal includes sensing a signal from the gateway.

In Example 22, the subject matter of Example 11 optionally includes wherein sensing a response signal includes sensing a signal via a back-end process.

In Example 23, the subject matter of Example 11 optionally includes wherein sensing a response signal includes sensing a signal via a mobile application.

Example 24 is at least one machine-readable medium including instructions that, when executed by processing circuitry, cause the processing circuitry to perform operations to implement of any of Examples 1-23.

Example 25 is an apparatus comprising means to implement of any of Examples 1-23.

Example 26 is a system to implement of any of Examples 1-23.

Example 27 is a method to implement of any of Examples 1-23.

This application is intended to cover adaptations or variations of the present subject matter. It is to be understood that the above description is intended to be illustrative, and not restrictive. The scope of the present invention should be determined with reference to the appended claims, along with the full scope of legal equivalents to which such claims are entitled.

What is claimed is:

1. A portable wireless interrogator device for selecting a location for deployment of a control device, comprising:
   one or more wireless interfaces comprising a wireless communications module and antennae;
   one or more controls on the portable wireless interrogator device configured to be actuated to trigger communication with a gateway for managing the control device, wherein the portable wireless interrogator device is configured to replicate wireless communication characteristics of the control device;
   one or more sensors configured to sense a response signal;
   a processor configured to determine a signal strength of the response signal; and
   one or more display elements on the portable wireless interrogator device configured to illuminate to provide an indication of the determined signal strength at candidate installation locations prior to deployment of the control device.

2. The device of claim 1, wherein the wireless communications module includes a Long Range (LoRa) module.

3. The device of claim 1, wherein the wireless communications module includes a Bluetooth module.

4. The device of claim 1, wherein the wireless communications module includes a Bluetooth Low Energy (BLE) module.

5. The device of claim 1, wherein the wireless communications module includes a near-field communications (NFC) module.

6. The device of claim 1, wherein the wireless communications module includes an Ethernet module.

7. The device of claim 1, wherein the wireless communications module includes a Wi-Fi module.

8. The device of claim 1, wherein the wireless communications module includes a WiMax module.

9. The device of claim 1, wherein the wireless communications module includes a cellular communications module.

10. The device of claim 1, wherein the wireless communications module includes a Zigby module.

11. A method, comprising:
   providing a portable wireless signal strength measurement device configured with one or more wireless interfaces to emulate communication capabilities of a control device;
   transporting the portable wireless signal strength measurement device to a potential location for placement of the control device;
   actuating a control on the portable wireless signal strength measurement device to trigger communication with a gateway for managing the control device, wherein the portable wireless signal strength measurement device is configured to replicate wireless communication characteristics of the control device;
   sensing a response signal using the portable wireless signal strength measurement device;
   determining a signal strength of the response signal using the portable wireless signal strength measurement device; and when the determined signal strength of the response signal is greater than or equal to a programmable threshold, selecting the potential location for placement of the control device prior to installing the control device at the potential location.

12. The method of claim 11, further comprising:

displaying an indication of the determined signal strength using the portable wireless signal strength measurement device.

13. The method of claim 12, wherein displaying the indication of the determined signal strength includes illuminating one or more light-emitting diodes (LEDs) on a surface of the portable wireless signal strength measurement device.

14. The method of claim 11, wherein actuating a control on the portable wireless signal strength measurement device includes pressing a button on the portable wireless signal strength measurement device.

15. The method of claim 11, wherein determining a signal strength of the response signal from the gateway using the portable wireless signal strength measurement device includes determining the signal strength in less than ten seconds.

16. The method of claim 11, wherein the control device includes an internet of things (IoT) device.

17. The method of claim 11, wherein the control device includes a pest control device.

18. The method of claim 17, wherein the pest control device includes a pest containment device.

19. The method of claim 11, wherein the one or more wireless interfaces includes a Long Range (LoRa) module communication interface.

20. The method of claim 11, wherein the one or more wireless interfaces includes a Bluetooth Low Energy (BLE) communication interface.

21. The method of claim 11, wherein sensing a response signal includes sensing a signal from the gateway.

22. The method of claim 11, wherein sensing a response signal includes sensing a signal via a back-end process.

23. The method of claim 11, wherein sensing a response signal includes sensing a signal via a mobile application.

* * * * *